(12) United States Patent
Papple et al.

(10) Patent No.: US 9,376,921 B2
(45) Date of Patent: Jun. 28, 2016

(54) INTERNALLY COOLED GAS TURBINE ENGINE AIRFOIL

(71) Applicant: Pratt & Whitney Canada Corp., Longueuil (CA)

(72) Inventors: Michael Papple, Verdun (CA); Ghislain Plante, Verdun (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 517 days.

(21) Appl. No.: 13/626,169

(22) Filed: Sep. 25, 2012

(65) Prior Publication Data

US 2014/0086756 A1    Mar. 27, 2014

(51) Int. Cl.
*F01D 5/18*    (2006.01)
*F01D 5/08*    (2006.01)

(52) U.S. Cl.
CPC ............... *F01D 5/187* (2013.01); *F01D 5/081* (2013.01)

(58) Field of Classification Search
CPC ........................................................ F01D 5/187
See application file for complete search history.

(56) References Cited

U.S. PATENT DOCUMENTS

| 4,278,400 | A | * | 7/1981 | Yamarik | F01D 5/187 415/115 |
| 5,395,212 | A | * | 3/1995 | Anzai | F01D 5/187 415/115 |
| 7,670,113 | B1 | * | 3/2010 | Liang | F01D 5/081 416/96 R |
| 2006/0051208 | A1 | * | 3/2006 | Lee | F01D 5/187 416/97 R |
| 2008/0050244 | A1 | * | 2/2008 | Cherolis | F01D 5/187 416/97 R |

* cited by examiner

*Primary Examiner* — Richard Edgar
(74) *Attorney, Agent, or Firm* — Norton Rose Fulbright Canada LLP

(57) ABSTRACT

A gas turbine engine airfoil has a hollow airfoil section extending chordwise between a leading edge and a trailing edge. The airfoil has a leading edge cooling passage and a separate serpentine passage for cooling a remaining portion of the airfoil. The serpentine passage has at least three segment serially interconnected in fluid flow communication. The leading edge cooling passage and the serpentine cooling passage have separate coolant inlets. The coolant inlet of the serpentine passage comprises a primary inlet branch connected in fluid flow communication with a first one of the segments of the serpentine passage and a secondary inlet branch connected in flow communication with a last one of the segments, thereby providing for a portion of the flow passing through the coolant inlet of the serpentine passage to be directly fed into the last segment of the serpentine passage.

14 Claims, 2 Drawing Sheets

US 9,376,921 B2

INTERNALLY COOLED GAS TURBINE ENGINE AIRFOIL

TECHNICAL FIELD

The application relates to internally cooled airfoil structures within a gas turbine engine.

BACKGROUND

The design of gas turbine engine airfoils, such as turbine blades and vanes, is the subject of continuous improvement. Indeed, the design directly impacts cooling efficiency and the service life of the airfoil components. In hot environments, blade and vane material creep and oxidation is a perennial problem.

Therefore, there continues to be a need for new cooling schemes for internally cooled gas turbine engine airfoils.

SUMMARY

In one aspect, there is provided an internally cooled airfoil for a gas turbine engine, comprising: an airfoil body extending chordwise between a leading and a trailing edge and spanwise between a root and a tip; a leading edge cooling passage extending spanwise through said airfoil body, said leading edge cooling passage having a leading edge coolant inlet defined in said root and a leading edge coolant outlet for discharging coolant from said leading edge cooling passage; a serpentine cooling passage extending through said airfoil body, said serpentine cooling passage being separate from said leading edge cooling passage and having at least a first spanwise segment disposed adjacent to the leading edge cooling passage, a second spanwise segment connected in fluid flow communication with the first spanwise segment and generally disposed in a mid-chord region of the airfoil body, and a third spanwise segment connected in fluid flow communication with the second spanwise segment and generally located in a trailing edge region of the airfoil body, the serpentine cooling passage further comprising a serpentine coolant inlet defined in the root of the airfoil and in fluid flow communication with the first spanwise segment, and at least one serpentine coolant outlet for discharging coolant from the third spanwise segment; and a bypass opening defined in the airfoil body for directing a portion of the coolant admitted into the serpentine coolant inlet directly into the third passage.

In another aspect, there is provided an internally cooled airfoil for a gas turbine engine, the airfoil comprising: an airfoil section extending chordwise between a leading edge and a trailing edge, a leading edge cooling passage extending radially through said airfoil section for cooling the leading edge of the airfoil section; a serpentine passage defined in said airfoil section for cooling a remaining portion of the airfoil section, the serpentine passage including at least three radially extending segments serially interconnected in fluid flow communication, the leading edge cooling passage and the serpentine cooling passage having separate coolant inlets, and wherein the coolant inlet of the serpentine passage comprises a primary inlet branch in fluid flow communication with a first one of the at least three spanwise segments of the serpentine passage and a secondary inlet branch in flow communication with a last one of the at least three spanwise segments, thereby providing for a portion of the flow passing through the coolant inlet of the serpentine passage to be directly fed into the last segment of the serpentine passage.

DETAILED DESCRIPTION

Figure 1:
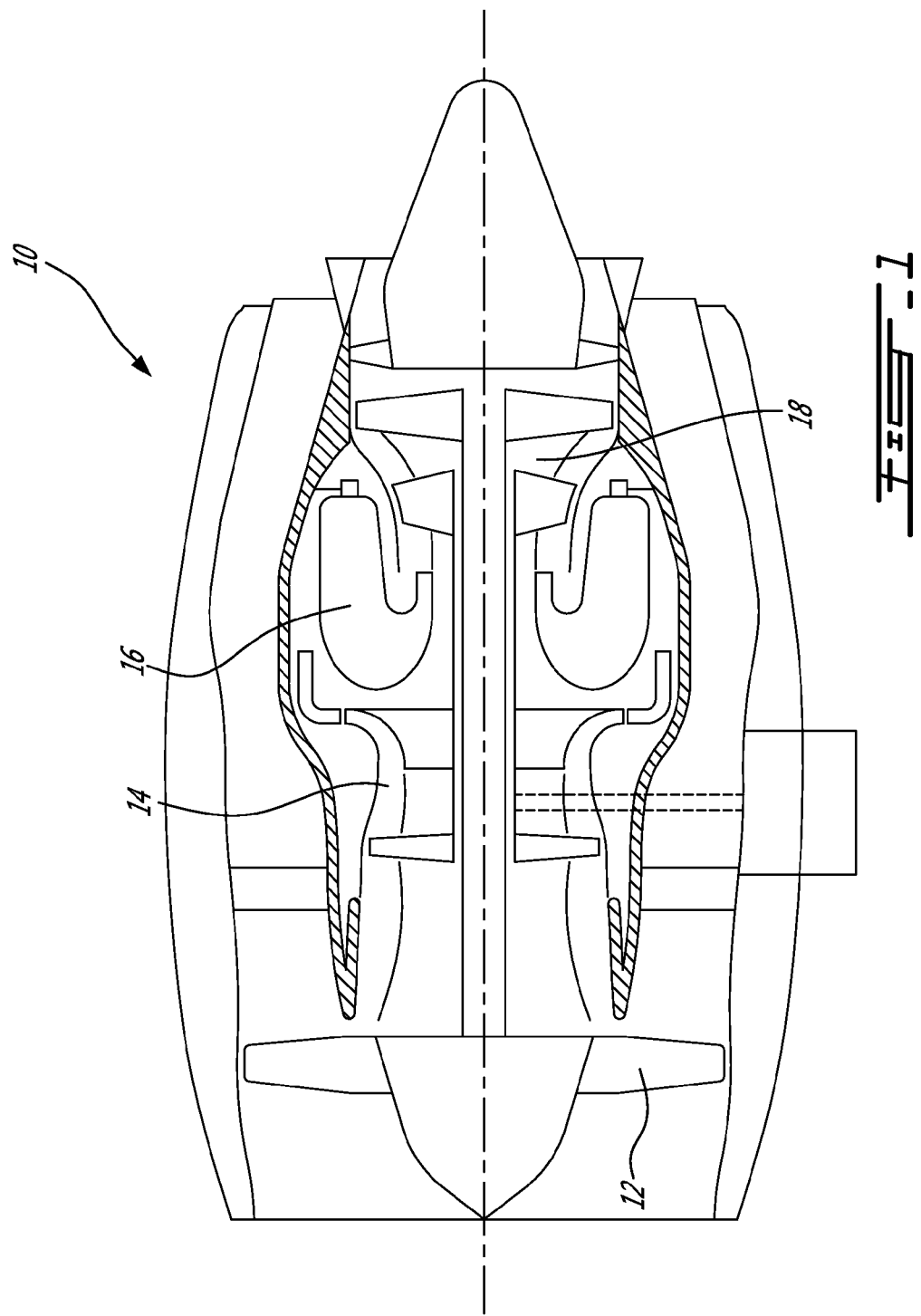
FIG. 1 shows a generic gas turbine engine to illustrate an example of a general environment in which the invention can be used.

FIG. 1 illustrates an example of a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
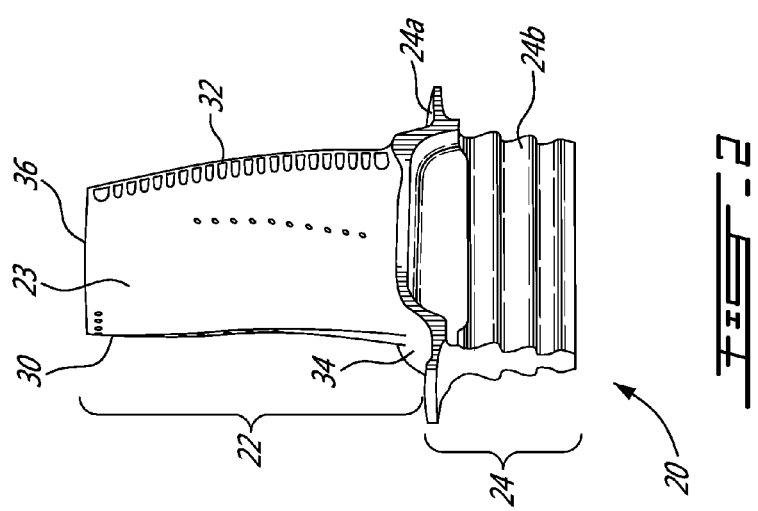
FIG. 2 is an isometric view of a turbine blade.

FIG. 2 shows a turbine blade 20 having an airfoil section 22 over which flows hot combustion gases emanating from the combustor 16. The airfoil section 22 extends from a root section 24, including a platform 24a and a root 24b. The root 24b may have a fir tree or other suitable fixing configuration for mating engagement in a corresponding groove defined in a turbine disc (not shown).

The airfoil section 22 has a pressure side wall 23 and an opposite suction side wall (not shown) extending chordwise between radially extending leading and trailing edges 30 and 32 and spanwise between an airfoil root 34 and a tip 36.

Figure 3:
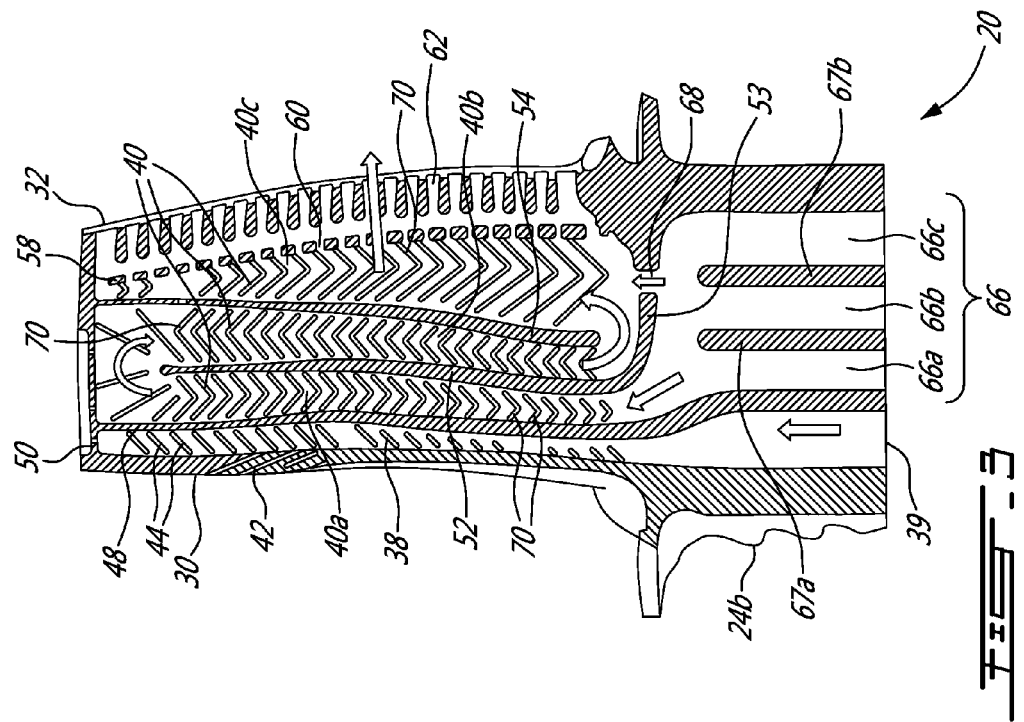
FIG. 3 is a cut open view of the turbine blade shown in FIG. 2 and illustrating an embodiment of an internal serpentine cooling scheme.

As shown in FIG. 3, an internal cooling circuit is defined in the turbine blade 20. As depicted by the arrows in FIG. 3, a coolant, such as cooling air bled from the compressor 14, flows through the cooling circuit to convectively cool the blade 20.

The cooling circuit may comprise a leading edge cooling passage 38 and a separate serpentine cooling passage 40 for cooling the remainder of the airfoil section 22. The leading edge cooling passage 38 extends spanwise or radially through the airfoil section 22 and the root section 24 of the blade 20. The leading edge cooling passage 38 may have a dedicated coolant inlet 39 defined in the radially inner end wall of the root 24b. The coolant flowing radially outwardly through the leading edge passage 38 is discharged into the main gas path of the engine via any appropriate outlet structure. For instance, the outlet structure may comprise a series of film holes 42 defined in the leading edge 30 of the airfoil section 22. The film holes 42 provide for the formation of a coolant film over the leading edge 30 of the airfoil. As shown in FIGS. 2 and 3, the film holes 42 may be distributed along the leading edge 30 of the airfoil section 22. As can be appreciated from FIG. 3, the film holes 42 may be angled to discharge coolant with an axially forward and a radially outward component. Heat transfer promoting structures, such as trip strips 44, may be provided in the leading edge cooling passage 38. The trip strips 44 may be arranged parallel to one another. The trip strips 44 may be angularly disposed so as to extend away from the leading edge 30 with a radially outward component. Also the trip strips may be of different length and configuration.

The serpentine cooling passage 40 may be provided in the form of a 3-pass serpentine cooling circuit including three serially interconnected spanwise or radially extending passage segments 40a, 40b, 40c. However, it is understood that the serpentine cooling passage 40 may comprise any suitable number of passes. For instance, the serpentine passage may comprise 5 passes.

The first passage segment 40a is adjacent and generally parallel to the leading edge cooling passage 38. The first segment 40a of the serpentine passage 40 is separated from the leading edge cooling passage 38 by a first internal partition wall or rib 48 extending between the pressure and suction side walls from the root 24 to a tip wall 50 extending in a chordwise direction between the leading edge 30 and the trailing edge 32 of the blade 20.

The first segment 40a is connected at its radially outer end to the second or median segment 40b of the serpentine passage 40 by a first 180° turn. The second passage 40b is generally located in a mid-chord region of the blade 20. A median partition wall or rib 52 separates the first and second segments 40a and 40b. The radially outer end of the rib 52 is spaced-radially inwardly from the tip wall 50 to define therewith the first 180° turn between the first and second segments 40a and 40b of the serpentine passage 40. The rib 52 extends radially outwardly from an internal rear chord partition 53 extending between the pressure and suction side walls in the platform area of the blade 20. The rear chord partition 53 spans the second and third segments 40b and 40c in the chordwise direction.

The third segment 40c of the serpentine passage 40 is located in the trailing edge region of the blade 20. The third segment 40c is separated from the second segment 40b by a third partition wall or rib 54 extending radially inwardly from the tip wall 50. The radially inner end of the third rib 54 is spaced radially inwardly from the rear chord partition 53 so as to define therewith a second 180° turn. The second 180° turn connects the radially inner ends of the second and third segments 40b and 40c in flow communication.

A fourth internal partition or crossover wall 58 extends in the spanwise direction between the pressure and suction walls of the airfoil section 22 of the blade 20. A series of crossover openings 60 are defined in the fourth partition wall 58. The crossover openings 60 are distributed along the crossover wall 58. By adjusting the size and the number of crossover openings 60 as a function of their spanwise location, it may be possible to appropriately module and control the flow of coolant discharged from the trailing edge segment 40c of the serpentine passage 40. For instance, the shape and size of the radially innermost crossover opening may be different than that of the radially outmost crossover opening.

The coolant flowing through the crossover openings 60 may be discharged out of the blade 20 via a series of radially spaced-apart exit slots 62 formed in the trailing edge 32 of the airfoil section 22 of the blade 20. The distribution and size of the trailing-edge exit slots 62 may be adjusted to ensure proper distribution of the cooling flow along the full spanwise extent of the trailing edge region of the blade. Also, it is understood that other suitable outlet structures may be used to discharge coolant from the last segment of the serpentine passage.

The serpentine cooling passage 40 has a coolant inlet 66 which is separate from the coolant inlet 39 of the leading edge cooling passage 38. The coolant inlet 66 of the serpentine passage 40 may be defined in the root 24b of the blade 20. According to the illustrated embodiment, the coolant inlet 66 comprises three coolant intakes 66a, 66b and 66c extending through the radially inner end wall of the blade root 24b. The coolant intakes 66a, 66b and 66c are distributed in the chordwise direction. Internal radial ribs 67a and 67b separate the intakes 66a, 66b and 66c. The number of internal ribs 67 and, thus, the number of intakes 66 is partly dictated by the stiffness/rigidity required in the root fixing region of the blade. Accordingly, the coolant inlet 66 of the serpentine passage 40 may comprise different number of intakes.

The front or first intake 66a is disposed in the chordwise direction just next to the coolant inlet 39 of the leading edge cooling passage 38. In other words, the first intake 66a is disposed just downstream of the coolant inlet 39 with respect to the incoming flow of coolant. The second intake 66b of the serpentine passage 40 is generally located in a mid-chord region of the blade 20 immediately downstream of the first intake 66a. Finally, the third or rear intake 66c is generally located in a trailing edge region of the blade 20 downstream of the second intake 66b relative to the incoming flow of coolant. All three intakes 66a, 66b and 66c lead to the first passage 40a of the serpentine passage 40 (i.e. they have a common output). The first passage 40a can, thus, be viewed as the inlet passage of the serpentine passage 40. A bypass opening 68 is defined in chord partition 53 to allow a portion of the coolant directed into the inlet 66 and, more particularly, into the rear intake 66c to flow directly into the third segment 40c of the serpentine passage 40 without first flowing through the first and second segments 40a and 40b thereof. The bypass opening 68 allows to bypass the first and second segments 40a and 40b and to feed the third segment 40c with an additional fresh incoming flow of coolant. The flow of coolant passing through the bypass opening 68 mixes with the main flow of coolant coming from the first and second segments 40a and 40b, thereby providing for a cooler flow through the last segment of the serpentine passage.

Trip-strips 70 or the like may also be provided in the serpentine passage 40. The trip strips 70 may have a V-shaped with the apex of the V disposed upstream with respect to the coolant flow through the segments of the serpentine passage 40.

In use, a coolant, such as pressurized air bled from the compressor 14, is fed to the inlet 39 of the leading edge cooling passage 38 and to the inlet 66 of the serpentine passage 40. A first portion of the compressor bleed air flows through inlet 39 and into the leading edge cooling passage 38 before being discharged through film holes 42 to form a cooling film over the leading edge area of the blade 20. A second portion of the bleed air supplied to the root 24 of the blade 20 is admitted through the intakes 66a, 66b and 66c of the serpentine passage inlet 66. A main portion of this second portion of the compressor bleed air is directed into the first segment 44a of the serpentine passage 40 while a smaller portion of the second flow portion flows directly into the third segment 40c via bypass opening 68. The air admitted to the first segment 40a flows from the first segment to the second segment 40b and then from the second segment 40b to the third segment 40c, where it mixes with the fresh cooling air flowing through the bypass opening 68. The combined flows are thereafter exhausted from the third passage 40c via the crossover openings 60 before being discharged out of the blade 20 via the trailing-edge exit slots 62. The separate cooling flows passing through the leading edge cooling passage 38 and the serpentine passage 40 may also be ejected through additional film cooling holes (not shown) defined in the pressure or suction side walls of the airfoil section 22 of the blade 20.

In order for coolant to pass radially through the leading-edge passage 38 and out film holes 42, it is necessary for the coolant pressure inside the leading-edge passage to be significantly higher than the air pressure on the outside of the airfoil near the film hole exits. This is easier to accomplish if the leading-edge passage is not in communication with the serpentine passage 40.

The cooling efficiency of a serpentine system is optimized to minimize the coolant flow. However, in some cases, without a dedicated leading edge passage, the heat pickup in the first serpentine passage leg may compromise the blade durability. So providing a dedicated leading edge passage improves the overall part durability.

Also having a separate leading-edge passage increases the number of vertical divider walls or partitions by one, which increases the blade stiffness. This allows the airfoil gas path wall thickness to be reduced and therefore contributes to a minimal blade weight.

In order to be able to add film holes on the pressure-side of the airfoil from the serpentine passage 40, the coolant pressure in the serpentine passage need to be significantly higher than the air pressure on the pressure-side of the airfoil. Adding a bypass opening 68 contributes to increase the coolant pressure in serpentine passage 40.

The above description is meant to be exemplary only, and one skilled in the art will recognize that changes may be made to the embodiments described without departing from the scope of the invention disclosed. For example, although application of the invention to a turbine blade is described and depicted herein, the invention may be applied to compressor and turbine blades and vanes. The invention can be used concurrently with other cooling techniques for increasing the heat transfer between the internal structures of the airfoil and the cooling air. The various means for promoting internal heat transfer between the internal structures and the cooling air include dimples, trip strips, pedestals, fins, etc. Other techniques to introduce turbulence into the cooling air flow to promoting convective heat transfer may also be used, or none at all may be used. Still other modifications will be apparent to those skilled in the art in light of a review of this disclosure and such modifications are intended to fall within the scope of the appended claims.

What is claimed is:

1. An internally cooled airfoil for a gas turbine engine, comprising: an airfoil body extending chordwise between a leading and a trailing edge and spanwise between a root and a tip; a leading edge cooling passage extending spanwise through said airfoil body, said leading edge cooling passage having a leading edge coolant inlet defined in said root and a leading edge coolant outlet comprising film holes distributed along the leading edge, the film holes being angled for discharging coolant with an axially forward and a radially outward component from said leading edge cooling passage, the leading edge cooling passage further including trip strips extending angularly away from a back side of the leading edge, the leading edge coolant inlet being configured to cause coolant to flow directly over the back side of the leading edge; a serpentine cooling passage extending through said airfoil body, said serpentine cooling passage being separate from said leading edge cooling passage and having at least a first spanwise segment disposed adjacent to the leading edge cooling passage, a second spanwise segment connected in fluid flow communication with the first spanwise segment and generally disposed in a mid-chord region of the airfoil body, and a third spanwise segment connected in fluid flow communication with the second spanwise segment and generally located in a trailing edge region of the airfoil body, the serpentine cooling passage further comprising a serpentine coolant inlet defined in the root of the airfoil and in fluid flow communication with the first spanwise segment, and at least one serpentine coolant outlet for discharging coolant from the third spanwise segment; and a bypass opening defined in the airfoil body for directing a portion of the coolant admitted into the serpentine coolant inlet directly into the third spanwise segment, the third spanwise segment including a row of spanwise distributed V-shaped trip strips, the apex of the V-shaped trip strips pointing towards the bypass opening, the V-shaped trip strips located at a tip end of the third spanwise segment being smaller than the V-shaped trip strips at a root end of the third spanwise segment, wherein the third spanwise segment has a rear crossover wall, and wherein the serpentine coolant outlet comprises a series of spanwise distributed crossover openings defined through the rear crossover wall and in fluid flow communication with a series of trailing-edge exit slots defined along the trailing edge of the airfoil body, and wherein the crossover wall becomes thinner in a spanwise direction from said root to said tip, and wherein the crossover openings and the trailing-edge exit slots have a size which varies as a function of their spanwise location.

2. The internally cooled airfoil defined in claim 1, wherein the serpentine coolant inlet comprises a plurality of intake openings spaced-apart along the chordwise direction of the airfoil body, said spaced-apart intake openings being all connected in fluid flow communication with an inlet end of said first spanwise segment.

3. The internally cooled airfoil defined in claim 2, wherein said plurality of intake openings are separated from said second and third spanwise segments by a rear internal partition wall extending in a chordwise direction at the root of the airfoil body, and wherein said bypass opening is defined through said rear internal partition wall.

4. The internally cooled airfoil defined in claim 2, wherein trip strips extend adjacent to the back side of the leading edge cooling passage.

5. The internally cooled airfoil defined in claim 1, wherein the third spanwise segment becomes gradually narrower in a spanwise direction away from the bypass opening.

6. An internally cooled airfoil for a gas turbine engine, the airfoil comprising: an airfoil section extending chordwise between a leading edge and a trailing edge, a leading edge cooling passage extending radially through said airfoil section for cooling the leading edge of the airfoil section; film holes distributed along the leading edge; a serpentine passage defined in said airfoil section for cooling a remaining portion of the airfoil section, the serpentine passage including at least three radially extending segments serially interconnected in fluid flow communication, the leading edge cooling passage and the serpentine cooling passage having separate coolant inlets, the coolant inlet of the leading edge cooling passage having a flow surface extending in continuity to a back side of the leading edge through which the film holes extend, thereby allowing coolant to directly flow from the coolant inlet of the leading edge cooling passage to the film holes, and wherein the coolant inlet of the serpentine passage comprises a primary inlet branch in fluid flow communication with a first one of the at least three spanwise segments of the serpentine passage and a secondary inlet branch in flow communication with a last one of the at least three spanwise segments, thereby providing for a portion of the flow passing through the coolant inlet of the serpentine passage to be directly fed into the last segment of the serpentine passage, the last segment narrowing down in a spanwise direction towards a tip of the airfoil, the last segment being separated from an adjacent one of the at least three radially extending segments by a partition wall which diverges away from the trailing edge as it extends towards a root of the airfoil, wherein the secondary inlet branch is provided in the form of a bypass opening defined in an internal partition wall of the airfoil, the bypass opening being generally aligned with a set of V-shaped trip strips distributed along the spanwise direction, each V-shaped trip strip having an apex pointing towards the bypass opening, the V-shaped trip strips at a tip end of the last segment being smaller than the V-shaped trip strips at a root end of the last segment, wherein said last segment is delimited on a rear side thereof by an internal crossover wall extending radially through the airfoil section, the crossover wall defining a plurality of radially spaced-apart crossover openings along the length thereof, wherein the cross-over wall narrows down in a spanwise direction towards the tip of the airfoil, and wherein the crossover openings have a size varying as a function of their spanwise location.

7. The internally cooled airfoil defined in claim 6, wherein said internal partition wall separates said coolant inlet of said serpentine passage from the last segment of the serpentine passage.

8. The internally cooled airfoil defined in claim 6, wherein the last segment of the serpentine passage extends radially in a trailing edge region of the airfoil section.

9. The internally cooled airfoil defined in claim 6, wherein the coolant flowing through the internal crossover wall is discharged from the airfoil section via a series of radially spaced-apart exit slots defined in the trailing edge of the airfoil section.

10. The internally cooled airfoil defined in claim 6, wherein the film holes are angled to discharge coolant with an axially forward and radially outward component.

11. The internally cooled airfoil defined in claim 10, wherein the coolant inlets of the leading edge cooling passage and of the serpentine passage extend radially through a root of the airfoil, the coolant inlet of the leading edge cooling passage being disposed upstream of the coolant inlet of the serpentine passage relative to an incoming flow of coolant.

12. The internally cooled airfoil defined in claim 11, wherein the coolant inlet of the serpentine passage comprises at least two inlet openings spaced-apart in the chordwise direction and both leading to the first segment of the serpentine passage.

13. The internally cooled airfoil defined in claim 6, wherein the airfoil is a turbine blade.

14. The internally cooled airfoil defined in claim 13, wherein the serpentine passage is a 3-pass serpentine passage.

* * * * *